United States Patent [19]

de Crombrugghe

[11] Patent Number: 4,468,057
[45] Date of Patent: Aug. 28, 1984

[54] PIPE COUPLING SYSTEM

[76] Inventor: Alain de Crombrugghe, 44 St. Alexandre, Limbour-Gatineau, Québec, Canada, J8V 1B4

[21] Appl. No.: 444,859

[22] Filed: Nov. 26, 1982

Related U.S. Application Data

[63] Continuation of Ser. No. 124,329, Mar. 31, 1980, abandoned.

[51] Int. Cl.³ .............................................. F16L 21/06
[52] U.S. Cl. ........................................ 285/373; 285/93
[58] Field of Search ............... 285/419, 373, 340, 337, 285/DIG. 12, 93

[56] References Cited

U.S. PATENT DOCUMENTS

| | | | |
|---|---|---|---|
| 2,341,164 | 2/1944 | Shimek | 285/340 |
| 2,457,077 | 12/1948 | Woolsey | 285/340 |
| 2,459,251 | 1/1949 | Stillwagon | 285/340 X |
| 2,490,640 | 12/1949 | Lefevre-Selmer | 285/373 X |
| 2,653,042 | 9/1953 | Aldrich et al. | 285/373 X |
| 3,239,254 | 3/1966 | Campbell | 285/419 X |
| 3,625,549 | 12/1971 | De Vries | 285/373 X |
| 3,927,158 | 12/1975 | Croft et al. | 285/337 X |
| 4,101,151 | 7/1978 | Ferguson | 285/373 X |
| 4,119,333 | 10/1978 | Straub | 285/373 X |
| 4,159,132 | 6/1979 | Hitz | 285/373 X |
| 4,273,367 | 6/1981 | Keeney et al. | 285/419 |

FOREIGN PATENT DOCUMENTS

| | | |
|---|---|---|
| 933547 | 9/1973 | Canada . |
| 935465 | 10/1973 | Canada . |
| 938635 | 12/1973 | Canada . |
| 940567 | 1/1974 | Canada . |
| 981723 | 1/1976 | Canada . |
| 995710 | 8/1976 | Canada . |
| 2819254 | 11/1978 | Fed. Rep. of Germany ...... 285/373 |
| 2377658 | 9/1978 | France ........................ 285/DIG. 12 |

Primary Examiner—Thomas F. Callaghan

[57] ABSTRACT

In pipe coupling systems, elaborate equipment and tools are required for their assembly and disassembly; the disassembly procedure is time consuming and little, if any, of the fittings can be reused.

The present invention relates to improvements in pipe attachment system to their fittings, particularly adapted for use with smooth surface pipe and tubing where assembly and disassembly is easily made with simple tools or without tools.

Except for the sealing ring, all parts of the system are reuseable without special preparation.

7 Claims, 5 Drawing Figures

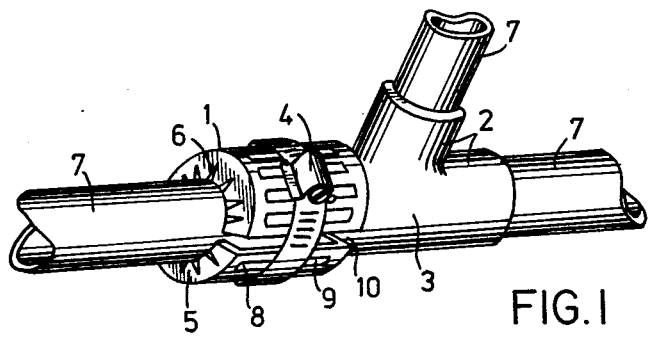
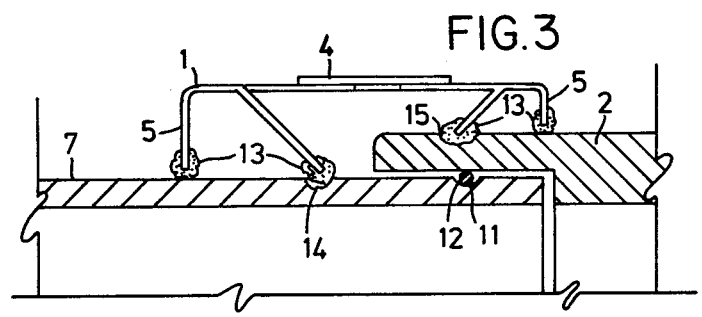
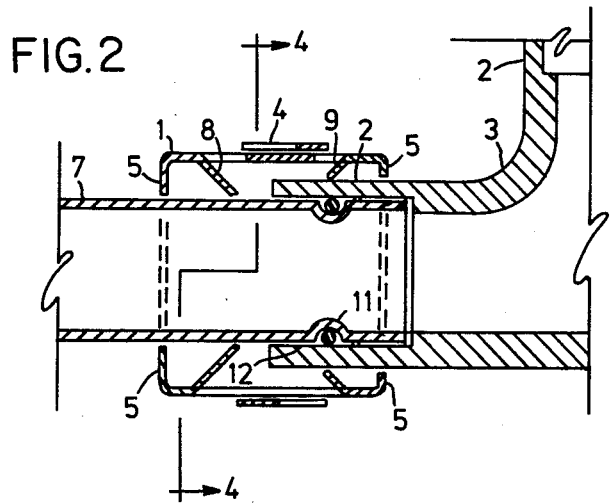

PIPE COUPLING SYSTEM

This is a continuation of application Ser. No. 124,329, filed Mar. 31, 1980, now abandoned.

BACKGROUND OF THE INVENTION

The invention is in the field of readily applicable and removeable clampable sleeve type couplings for effecting joints between pipes and their fittings.

More specifically the coupling of the invention is intended for use with smoth surface pipes and tubing and their fittings as normally used in known and conventional methods of assembly such as threading soldering, glueing, brazing or welding.

There is a need for a simple device to connect pipes to their fittings that is economical, not only to manufacture, but also in actual installation and use.

Such a device, to achieve the greatest economy, must permit easy assembly, equally easy disassembly, and must permit the salvage of the maximum amount of components of the system; this device according to the invention permits the reusage, time after time, of all components provided their integrity is safeguarded.

It is known that disastrous fires were caused, directly or indirectly, by the use of open flame or by the emanation of inflamable fumes and their subsequent ignition during the installation or alteration of plumbing systems; this device according to the invention eliminates these hazards since no flamable components, heat or flame is required for its installation.

It is known that lack of thorough desoxydation and cleaning of the components of plumbing systems requiring soldering or glueing results in weak or leaking joints, which in turn require dismantling and reinstallation, sometimes at the cost of a number of new and extra fittings and material and great expense of time; this device according to the invention does not require such thorough desoxydation and cleaning, resulting in savings of time, because it relies on its composition seal for fluid tightness. Most known systems of pipe joints depend on their purposemade fittings, ordinarily compatible only within their own system, to function and their adaptability to different systems is very limited if non existent; this device according to the invention makes use of fittings normally used with other conventional joining methods without recurring to their hazard prone joining techniques and favors adaptation of this invention with other joining methods wherever tolerances between components permit.

This flexibility permits the creation of hybrid systems where one side is joined conventionally and the other side with the coupling subject of this disclosure.

Most known systems of pipe joints require the use of tools in the assembly and disassembly of the coupling or fitting; this device according to the invention offers the choice between hand or tool operable clamping means, which in hand operable clamping means offers an obvious time saving potential to the user.

First development of the invention revealed a major weakness in its retaining means, which could accidentally be released while the system is pressurized and this condition was also found in Canadian Pat. No. 498,350 to Ferguson Dec. 15, 1953; this undesirable feature is overcome in the device subject of the disclosure as only willfull release of the retainer sleeve, while the system is pressurised, may result in loss of fluid tightness.

Some known systems of pipe joints depend on grooves in the pipe ends to mechanically secure the pipes to their fittings, said grooves being ordinarily square edged in profile to ensure more positive and non slip contact of retaining lugs; the device according to the invention makes similarly use of a groove in the end of the pipe and of the fitting to ensure a positive grip of the lugs both on the pipe and on the fitting end in a very different way as explained hereafter.

This groove must be distinguished from the gasket seating groove whose function is solely related to the fluid tightness of the system, this first mentioned groove shall be called slip resisting groove as opposed to the gasket groove.

The slip resisting groove need not be square in profile but may be of any profile suitable to provide slip resistance for the lugs of the retainer sleeve; depending on the pipe or fitting material this slip resisting groove can be square, V shaped or rounded according to the characteristics of the pipe or fitting material and the easiest method of forming such groove. The profile of the slip resisting groove is dictated by the stress characteristics of the material of the pipe and/or fitting; a rounded groove profile offers the benefit of minimizing the occurrence of localized stress points, ordinarily found to be the cause of failure, and provides an infinity of contact planes parallel to the end plane of the lugs; this is particularly important as it provides automatic adjustment for varying lug angles relatively to the pipe longitudinal axis, specially under varying pressure loads.

It is known that soldered fittings can be unsoldered only when the fitting and the pipe adjacent thereto are completely drained; since the device according to the invention does not require any heat in order to be removed but only unlocking of the retainer sleeve, it is now clear that no time is wasted draining the system.

This feature of easy removal leads to other potential economies since any such retainer sleeve used in conjunction with a end cap or any other type of fitting at low points of plumbing systems will act as low cost drains. Further research led to the present disclosure wherein a combination of the above described and some other desirable features are incorporated.

The device and system according to the invention consist of the following:

1. a clampable one piece split retainer sleeve,
2. a hand or tool operable clamping means,
3. a sealing gasket of known design and composition,
4. a rounded groove in the pipe end to seat the sealing gasket,
5. a slip resisting groove in the end of the pipe and of the fitting where such a groove is required by the nature of the pipe and/or fitting.

DRAWING DESCRIPTION

Referring to the drawings:

FIG. 1 is a perspective view of the retainer sleeve showing one preferred embodiment of the invention fitted on one end of a (Tee) fitting;

FIG. 2 is a section through the connection end of a (Tee) fitting showing the relative position of the components of the system using thin wall tubing;

FIG. 3 is a detail section showing the use of slip resisting grooves with optional gaskets on lugs and shoulders; said slip resisting grooves being required only on pipes and fittings of such hardness as to prevent the lugs to grip safely on said pipes and fittings;

Figure 4:
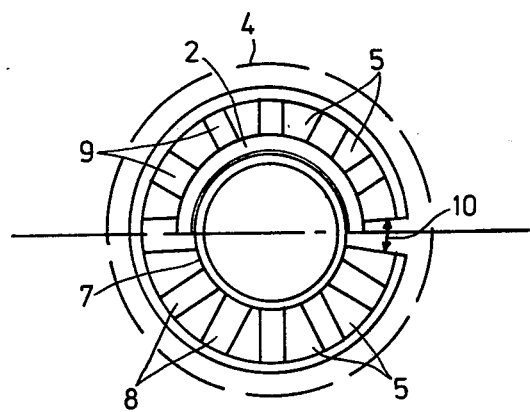
FIG. 4 is a transverse section of the retainer sleeve showing the lug arrangement and a symbolic clamping means.

The numeral 1 indicates the retainer sleeve, which in FIG. 1 is wrapped around the end 2 of the fitting 3 and held in place with a clamping means 4. The retainer sleeve 1 consists of a strip of spring type material with unequal shoulders 5, notched 6 to permit easy bending around the pipe 7 and the fitting end 2; said retainer sleeve 1 exhibits one row of long sloping lugs 8 bent radially towards the fitting end 2 and engaging into the exterior surface of the pipe 7, while a second row of short sloping lugs 9 are bent in a similar but opposed direction to engage into the exterior surface of the fitting end 2.

The retainer sleeve 1 is engaged by means of the short 9 and long 8 lugs respectively to the fitting end 2 and the pipe 7 in a semi-wrap around fashion, the opening 10 permitting the installation of the retainer sleeve 1 without need of dismantling the pipe-fitting 7-3 assembly; the tightening or loosening of the clamping means 4 permits the securing or removing respectively of the retainer sleeve 1 to or from the pipe-fitting 7-3 assembly. A gasket seating groove 11 is rolled, or otherwise fabricated at a predetermined distance from the end of the pipe 7, said groove to receive an annular gasket 12, or O ring, which gasket 12 provides for the fluid tightness of the system; the composition of the gasket 12 shall be compatible with the type of fluid handled in the system and the type of material constituting the system.

Referring to FIG. 3, the shoulders 5, the short 9 and the long 8 lugs are wrapped with a resilient material 13, which provides for even pressure distribution on the pipe 7 or fitting end 2; this optional protection is intended, among other things, to lessen pipe 7 or fitting 3 breakage due to thermal or mechanical stress built-up in brittle or fragile pipe 7 or fitting 3 material.

Figure 5:
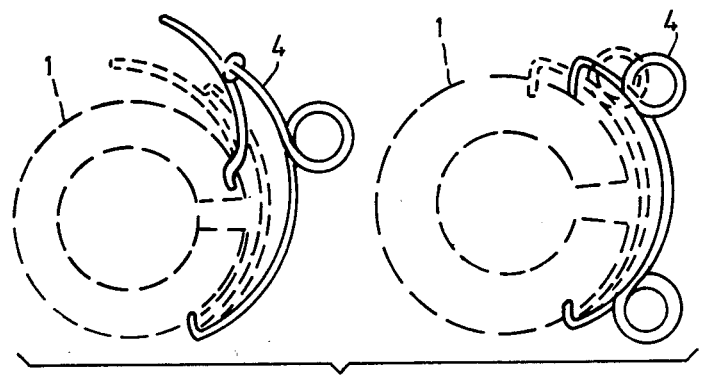
FIG. 5 illustrates two preferred toolless clamping means. In the drawings like characters of reference indicate corresponding parts in each figure.

Referring to FIG. 3, a second (slip resisting) groove 14 on the pipe 7 end is fabricated in a similar manner as the groove 11 destined to the gasket 12; said second groove 14 acts as a mechanical stop providing slip resistance to the long 8 lugs. A similar arrangement in the form of a groove 15 is fabricated in the exterior surface of the fitting end 2 at a predetermined distance, said groove 15 acts as a mechanical stop for the short 9 lugs providing slip resistance against forces induced by pressure within the system. FIG. 5 shows in dotted lines the profile of two retainer sleeves 1, each displaying a preferred clamping means 4, which retainer sleeve 1 can be installed or removed without the use of tools; this illustrates some of a multitude of clamping means 4 suitable for the system according to design requirements.

Many adaptations of the system are possible where the short 9 lugs and the adjacent shoulder 5 are replaced with a retaining means in the form of screw type serrations, lugs to fit in grooves or adaptable to screws screwable in the fitting 3 body. Joints made according to the disclosure are quite simple to make:

Firstly the pipe 7 is prepared with a suitable tool by rolling or otherwise fabricating a groove 11 or a plurality of grooves 11-14 at a predetermined distance from the end of the pipe 7 in order for the first groove 11 to be completely lodged inside of the fitting end 2 when the pipe 7 is forced into said fitting end 2;

Secondly an annular gasket 12, or O ring, is slipped over the pipe end 7 and seated in the first groove 11 to provide for the fluid tightness of the system once inserted into the fitting end 2;

Thirdly the fitting end 2 is inspected for smoothness and cleanliness and the prepared pipe 7, loaded with its sealing gasket 12, is inserted into the fitting end 2 until it butts against the inside shoulder or stop of the fitting 3;

Fourthly the retainer sleeve 1 is opened and slipped over and around the pipe 7, positionned over the fitting end 2 and part of the pipe 7, at this point the clamping means 4 is thightened and the system is ready for testing and subsequent use.

This step requires the checking that the lugs are falling into their respective slip resisting grooves when these are used; under normal conditions slip resisting grooves are not required or used and no other checking than that the pipe is fully inserted is required before applying clamp pressure.

Reversing the procedure permits equally easy disassembly; reassembly, omitting step one, is immediately possible without further preparation of the components provided they are not damaged.

The embodiment of the invention in which an exclusive property of privilege is claimed are defined as follows:

1. A pipe coupling apparatus, comprising, in combination:
   a unitary pipe coupling member having:
   a cylindrical tubular body portion adapted to concentrically straddle a joint between a pipe and a pipe fitting in spaced relation thereto, said body portion having a pair of opposed longitudinal edges and being transversely elastically deformable so as to permit separation of said edges for positioning of said body portion over a pipe joint, a first plurality of elongated, longitudinally extending openings circumferentially spaced about said body portion adjacent one end thereof and a second plurality of elongated, longitudinally extending openings circumferentially spaced about said body portion adjacent the other end of said body portion;
   first flange means extending radially inwardly from said one end of said body portion, said first flange means defining an aperture sized to loosely receive the peripheral surface of a pipe in an uncompressed condition of said body portion and abuttingly engage said surface of said pipe in a compressed condition of said body portion for maintaining said one end of said body portion in substantially concentric relation with said pipe;
   second flange means extending radially inwardly from the other end of said body portion and having an aperture sized to loosely receive the peripheral surface of a pipe fitting disposed within said body portion in an uncompressed condition of said body portion and abuttingly engage said peripheral surface of said pipe fitting in a compressed condition of said body portion for maintaining said other end of said body portion in substantially concentric relation with said pipe fitting;
   a first plurality of lug members, each said lug member extending from the outer end of one of said openings of said first plurality of openings and extending inwardly of said body portion at an acute angle thereto toward said other end of said body portion, each said lug member having a free end engageable with a peripheral groove formed in the outer surface of a pipe disposed within said body portion in said compressed condition of said body portion for resisting axial outward movement of said pipe from said one end of said body portion;

a second plurality of spaced lug members, each said lug of said second plurality of spaced lug members extending from the outer end of one of said openings of said second plurality of openings and extending inwardly of said body portion at an acute angle thereto toward said one end of said body portion, each said lug of said second plurality of lugs having a free end engageable with a peripheral groove formed in the outer surface of a pipe fitting disposed within said body portion in said compressed condition of said body portion for resisting axial outward movement of said fitting through said other end of said body portion; and clamp means for radially inwardly compressing said body portion.

2. A pipe coupling system as defined in claim 1 wherein:

the first and second flange means are fitted with gasketting means for stress distribution and equalisation;

the first and second plurality of lug members are fitted with gasketting means for stress distribution and equalisation.

3. A pipe joint system comprising, in combination:

a pipe member having a first peripheral groove adjacent one end thereof and a second peripheral groove inwardly axially spaced from said first peripheral groove;

a pipe fitting having an opening at one end thereof adapted to telescopically and matingly receive said one end of said pipe and a peripheral groove adjacent said one end thereof;

annular seal means adapted to be interposed between said first peripheral groove of said pipe and said opening of said pipe fitting for sealing said pipe and said pipe fitting;

a unitary pipe coupling member for axially securing together said pipe and said pipe fitting; and clamp means for radially inwardly compressing said unitary pipe coupling member;

said unitary pipe coupling member having:

a cylindrical tubular body portion adapted to concentrically straddle a pipe joint defined by said pipe and said pipe fitting in spaced relation thereto, said body portion having a pair of opposed longitudinal edges and being transversely elastically deformable so as to permit separation of said edges for positioning of said body portion over said pipe joint, a first plurality of elongated, longitudinally openings circumferentially spaced about said body portion adjacent one end thereof and a second plurality of elongated, longitudinally openings circumferentially spaced about said body portion adjacent the other end thereof;

first flange means extending radially inwardly from one end of said body portion, said first flange means defining an aperture sized to loosely receive the peripheral surface of said pipe in an uncompressed condition of said body portion and abuttingly engage said surface of said pipe in a compressed condition of said body portion for maintaining said one end of said body portion in substantially concentric relation with said pipe;

second flange means extending radially inwardly from the other end of said body portion and having an aperture sized to loosely receive the peripheral surface of a pipe fitting disposed within said body portion in an uncompressed condition of said body portion and abuttingly engage said peripheral surface of said pipe fitting in a compressed condition of said body portion for maintaining said other end of said body portion in substantially concentric relation with said pipe fitting;

a first plurality of lug members, each lug member extending from the outer end of one of said openings of said first plurality of openings and extending inwardly of said body portion at an acute angle thereto toward said other end of said body portion, each said lug member having a free end engageable with said second peripheral groove of said pipe in said compressed condition of said body portion for resisting axial outward movement of said pipe from said one end of said body portion;

a second plurality of lug members, each said lug member of said second plurality of spaced lug members extending from the outer end of one of said openings of said second plurality of openings and extending inwardly of said body portion at an angle thereto toward said one end of said body portion, each said lug of said second plurality of lugs having a free end engageable with said peripheral groove of said pipe fitting in said compressed condition of said body portion for resisting axial outward movement of said fitting through said other end of said body portion.

4. A pipe coupling system as defined in claim 3, wherein:

the first and second flange means are fitted with gasketting means for stress distribution and equalisation;

the first and second plurality of lug members are fitted with gasketting means for stress distribution and equalisation.

5. A pipe coupling system, comprising, in combination:

a pipe member having a groove at one end thereof;

a pipe fitting member adapted to telescopically and matingly receive said pipe;

annular seal means adapted to seal the pipe joint defined by said pipe and said pipe fitting;

a unitary pipe coupling member adapted to retain said pipe and said pipe fitting in substantially concentric relation to form a pipe joint;

clamp means to radially compress said pipe coupling member;

said unitary pipe coupling member having:

a cylindrical tubular body portion adapted to concentrically straddle a pipe joint defined by said pipe and said pipe fitting in spaced relation thereto, said body portion having a pair of opposed longitudinal edges and being transversely elastically deformable so as to permit separation of said edges for positioning of said body portion over said pipe joint, a first plurality of elongated, longitudinally extending openings circumferentially spaced about said body portion adjacent one end thereof and a second plurality of elongated, longitudinally extending openings circumferentially spaced about said body portion adjacent the other end thereof;

first flange means extending radially inwardly from one end of said body portion, said first flange means defining an aperture sized to loosely receive the peripheral surface of said pipe in an uncompressed condition of said body portion and abuttingly engage said surface of said pipe in a compressed condition of said body portion for maintaining said one end of said body portion in substantially concentric relation with said pipe;

second flange means extending radially inwardly from the other end of said body portion and having an aperture sized to loosely receive the peripheral surface of said pipe fitting disposed within said body portion in an uncompressed condition of said body portion and abuttingly engage said peripheral surface of said pipe fitting in a compressed condition of said body portion for maintaining said other end of said body portion in substantially concentric relation with said pipe fitting;

a first plurality of lug members, each said lug member extending from the outer end of one of said openings of said first plurality of openings and extending inwardly of said body portion at an acute angle therto toward said other end of said body portion, each said lug member having a free end engageable with the peripheral surface of said pipe in said compressed condition of said body portion for resisting axial outward movement of said pipe from said one end of said body portion;

a second plurality of lug members, each said lug member of said second plutality of spaced lug members extending from the outer end of one of said openings of said second plurality of openings and extending inwardly of said body portion at an acute angle thereto toward said one end of said body portion, each said lug of said second plurality of lugs having a free end engageable with the peripheral surface of said pipe fitting in said compressed condition of said body portion for resisting axial outward movement of said pipe fitting through said other end of said body portion.

6. A pipe coupling system as defined in claim 5 wherein:

the pipe member has a second groove at a predetermined distance from the end of said pipe to engage with the free end of said plurality of lug members to resist longitudinal separation of said pipe from said one end of said body portion;

the pipe fitting member has a peripheral groove at a predetermined distance from its end to engage with the free end of said second plurality of lug members to resist longitudinal separation of said pipe fitting from said other end of said body portion.

7. A pipe coupling system as defined in claim 6 wherein:

the first and second said flange means are fitted with gasketting means for stress distribution and equalisation;

the first and second said plurality of lugs are fitted with gasketting means for stress distribution and equalisation.

* * * * *